United States Patent
Clem et al.

(10) Patent No.: US 6,304,466 B1
(45) Date of Patent: Oct. 16, 2001

(54) POWER CONDITIONING FOR REMOTELY MOUNTED MICROWAVE POWER AMPLIFIER

(75) Inventors: Robert E. Clem, Arlington Heights; Robert H. Zawislak, Palatine; John M. Rein, Elgin, all of IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/516,863

(22) Filed: Mar. 2, 2000

(51) Int. Cl.$^7$ ............................. H02M 1/12; H02M 7/68
(52) U.S. Cl. ............................. 363/41; 363/98; 330/297
(58) Field of Search ............................. 363/17, 40, 41, 363/55, 58, 98, 132; 330/277, 297

(56) References Cited

U.S. PATENT DOCUMENTS

| | | |
|---|---|---|
| 3,585,517 | 6/1971 | Herbert . |
| 3,636,380 * | 1/1972 | Anderson ............................. 307/261 |
| 3,931,581 | 1/1976 | Kush, Jr. et al. . |
| 3,947,779 | 3/1976 | Reinhard . |
| 3,950,691 | 4/1976 | Ohba . |
| 4,037,271 * | 7/1977 | Keller ............................. 363/21 |
| 4,042,890 * | 8/1977 | Eckerle ............................. 330/207 A |
| 4,276,586 * | 6/1981 | Boekhorst ............................. 363/21 |
| 4,316,242 * | 2/1982 | Colangelo et al. ............................. 363/21 |
| 4,404,622 | 9/1983 | Cherry . |
| 4,821,165 * | 4/1989 | Gunn ............................. 363/60 |
| 4,866,344 * | 9/1989 | Ross et al. ............................. 315/3.5 |
| 4,899,113 * | 2/1990 | Buikema ............................. 327/530 |
| 5,159,515 | 10/1992 | Fishbein . |
| 5,317,496 * | 5/1994 | Seiersen ............................. 363/24 |
| 5,319,535 | 6/1994 | Brennen . |
| 5,428,642 | 6/1995 | Ponto . |
| 5,448,443 | 9/1995 | Muelleman . |
| 5,502,412 | 3/1996 | Choi et al. . |
| 5,583,402 * | 12/1996 | Moisin et al. ............................. 315/307 |
| 5,592,058 * | 1/1997 | Archer et al. ............................. 318/254 |
| 5,666,255 | 9/1997 | Muelleman . |
| 5,686,860 | 11/1997 | Matyas . |
| 5,777,519 * | 7/1998 | Simopoulos ............................. 330/297 |
| 5,949,658 * | 9/1999 | Thottuvelil et al. ............................. 363/15 |

\* cited by examiner

*Primary Examiner*—Peter S. Wong
*Assistant Examiner*—Bao Q. Vu
(74) *Attorney, Agent, or Firm*—Terry J. Anderson; Karl J. Hoch, Jr.

(57) ABSTRACT

An apparatus and method are disclosed for regulating a high voltage DC supply derived from a plurality of unstable high voltage signals. The invention functions to derive a high voltage DC signal from a received unstable high voltage signals. A derived signal is modulated and communicated to a series resonant regulation circuit by varying the operating frequency of the modulation device, while maintaining a fixed pulsed width full duty cycle operation, the output signal is translated in relation to the resonant frequency of the series resonant circuit, causing corresponding variations in the output voltage level.

15 Claims, 20 Drawing Sheets

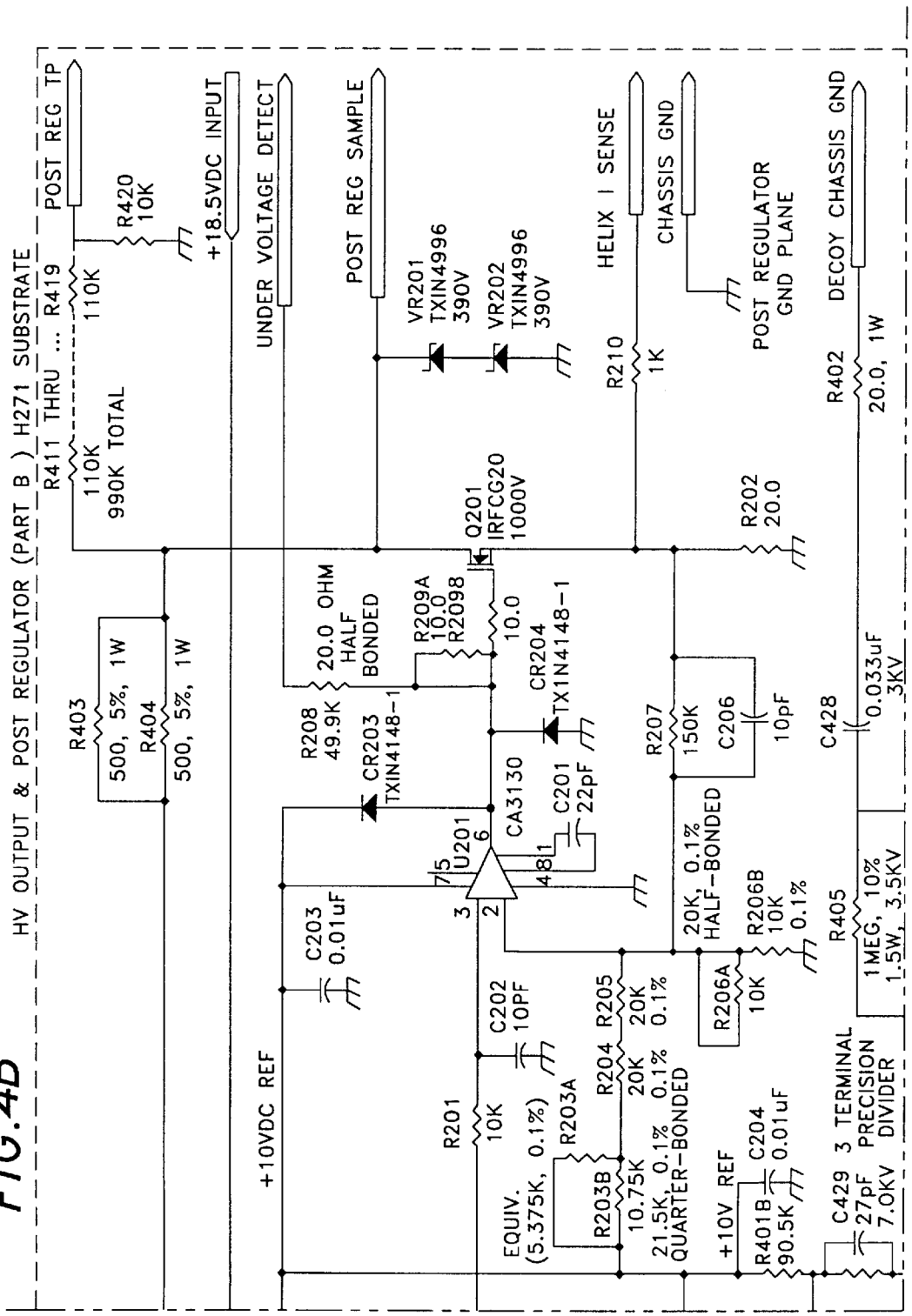
FIG.4B — HV OUTPUT & POST REGULATOR (PART B) H271 SUBSTRATE

POWER CONDITIONING FOR REMOTELY MOUNTED MICROWAVE POWER AMPLIFIER

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates to apparatus and technique for regulating stacked high voltage DC power supplies, e.g., having individual section output voltages in the range of 300 to 1,000 volts DC. More particularly, the invention relates to an invertor circuit for deriving stable, high voltage supplies from unstable reference voltages, with the minimum of weight and complexity.

One application of the present invention concerns towed aircraft decoys incorporating high voltage components, such as traveling wave tubes. Such devices normally require multiple high voltage inputs, only some of which may be directly available from the aircraft voltage distribution system. Signals and high voltage inputs are communicated from the aircraft to the decoy via an extended length tow line. The high voltage inputs are attenuated by the tow line by amounts that correspond to factors such as length of the tow line, the temperature which the tow line is exposed, and other environmental factors. As a result, the voltage levels received by the decoy may vary considerably in response to particular flight conditions. In turn, those variances cause instability in relation to power signals derived from the voltage levels communicated via the tow line. As a result of those variances in the required and derived voltage levels, the efficiency of the decoy invertor circuit is reduced, and output of the traveling wave tube may be degraded.

Contemporary devices have utilized techniques for regulating outputs derived from unstable input sources. One such technique is based on pulse width modulation in response to received signal levels. By modulating the pulse width, the invertor output voltage may be regulated to remain within confined limits. However, pulse width modulation techniques typically require complex circuitry adapted to accommodate pulse width changes within the switching circuitry. While such contemporary techniques are suitable for certain applications, they are less useful in environments where space and complexity limitations favor simple techniques that reliably function in hostile temperature or electronic environments.

The present invention is directed to providing such apparatus and techniques for regulating derived high voltage DC signals, using a simple technique that will reliably operate in a variety of hostile environments.

Although not specific to towed decoy applications, this technology lends itself to operation of high frequency power amplifiers where compact, efficient, and capable power conditioner circuitry is locally installed in a decoy aerobody. A three wire towed decoy topology, for example, provides source voltages of −2000 Vdc, +350 Vdc, and a return line for a remotely located high frequency power conditioner via a small wire gauge tow cable. For such decoy applications, at least two high frequency power amplifiers are required (TWTs), which results in a total input power of over 1400 Watts with full RF drive.

Due to resistive tow cable losses and the resulting power transfer limitations, power requirement for such applications cannot be taken from the +350 Vdc source. The alternate method of providing this power, at the end of the tow cable, is to use the high voltage, −2000 Vdc, as the prime power source for the remote resonant switch mode invertor. Resistance and power transfer limitations will force a split of power from the −2000V source and from the +350 V source.

BRIEF SUMMARY OF THE INVENTION

An apparatus and method are disclosed for regulating a high voltage DC supply derived from a plurality of unstable high voltage signals. The invention functions to derive a high voltage DC signal from a received unstable high voltage signals. A derived signal is modulated and communicated to a series resonant regulation circuit by varying the operating frequency of the modulation device, while maintaining a fixed pulsed width full duty cycle operation, the output signal is translated in relation to the resonant frequency of the series resonant circuit, causing corresponding variations in the output voltage level.

DETAILED DESCRIPTION OF THE DRAWINGS

DETAILED DESCRIPTION OF PREFERRED EMBODIMENT

The detailed description as set forth below in connection with the appended drawings is intended as a description of the presently preferred embodiments of the present invention, and are not intended to represent the only form in which the present invention may be constructed or utilized. The description sets forth functions and sequence of steps for constructing and operating the invention in connection with the illustrated embodiments. It is understood, however, the same or equivalent functions and sequences may be accomplished by different embodiments and that they are also intended to be encompassed within the spirit and scope of this invention.

As noted above, with remotely mounted or off-board power conditioners the cable losses, associated with power delivery, become the dominant loss mechanisms. One technique for minimizing losses is to use a high voltage source (1600V to 2400V) as input to a remotely mounted high voltage, resonant, switch mode invertor. A unique resonant, full duty cycle, half-bridge invertor was invented for this application, consisting of six 1000V FETs in series. The invertor is used to "chop" the high voltage input, providing the primary voltage for a unique high voltage step-down transformer. To complement this topology, a frequency modulated control circuit was implemented, via an external control loop to maintain transformer output voltages to safe levels.

Figure 3:
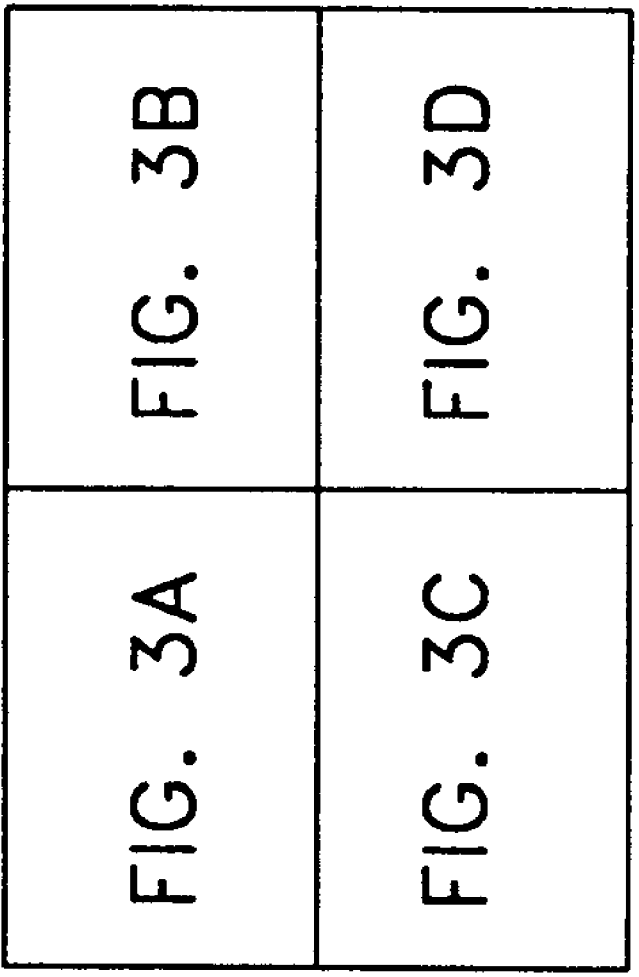
FIG. 3 is an electrical schematic diagram of a variable frequency invertor drive and resonant invertor, in accordance with the present invention.
Figure 3A:
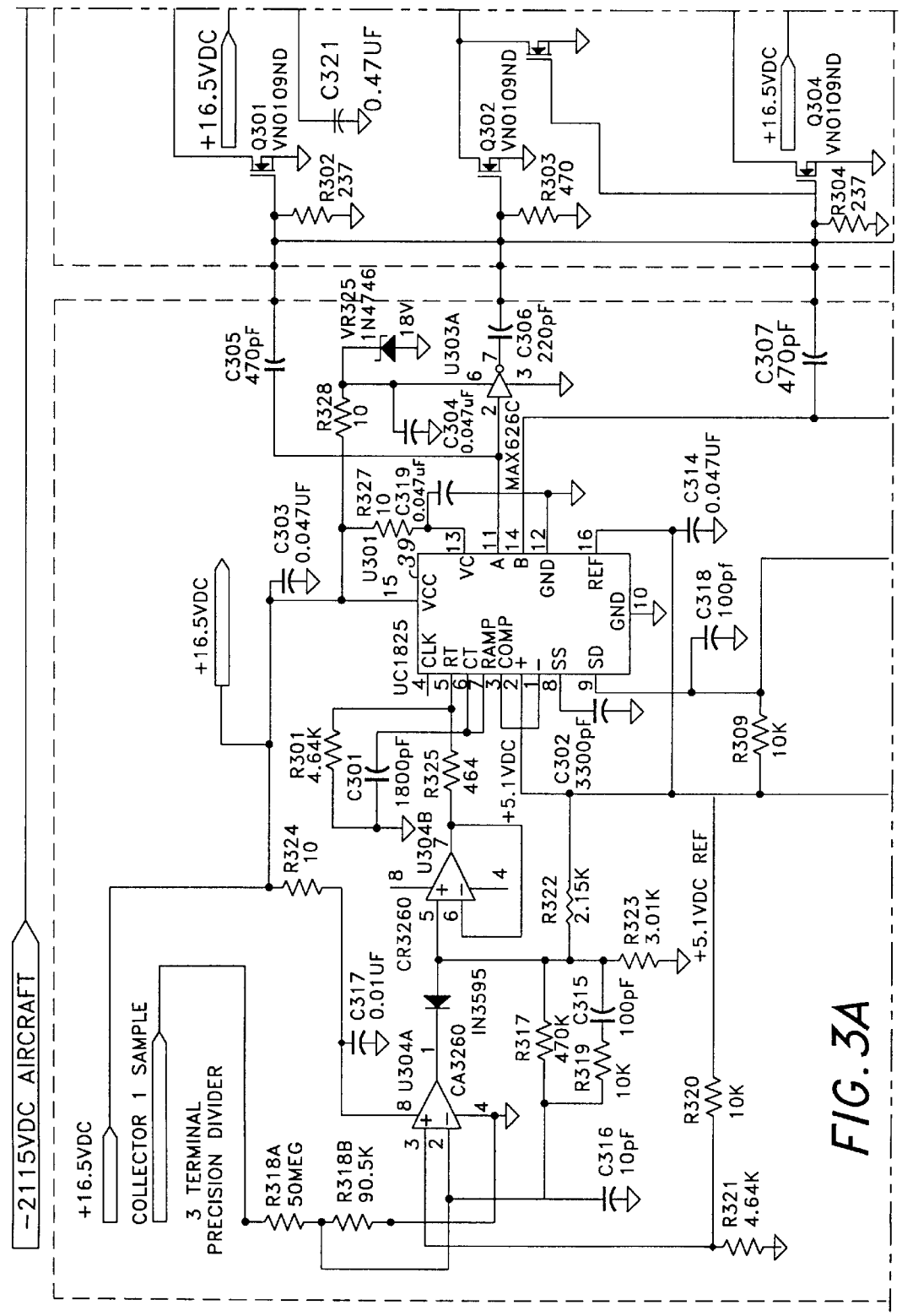
Figure 3B:
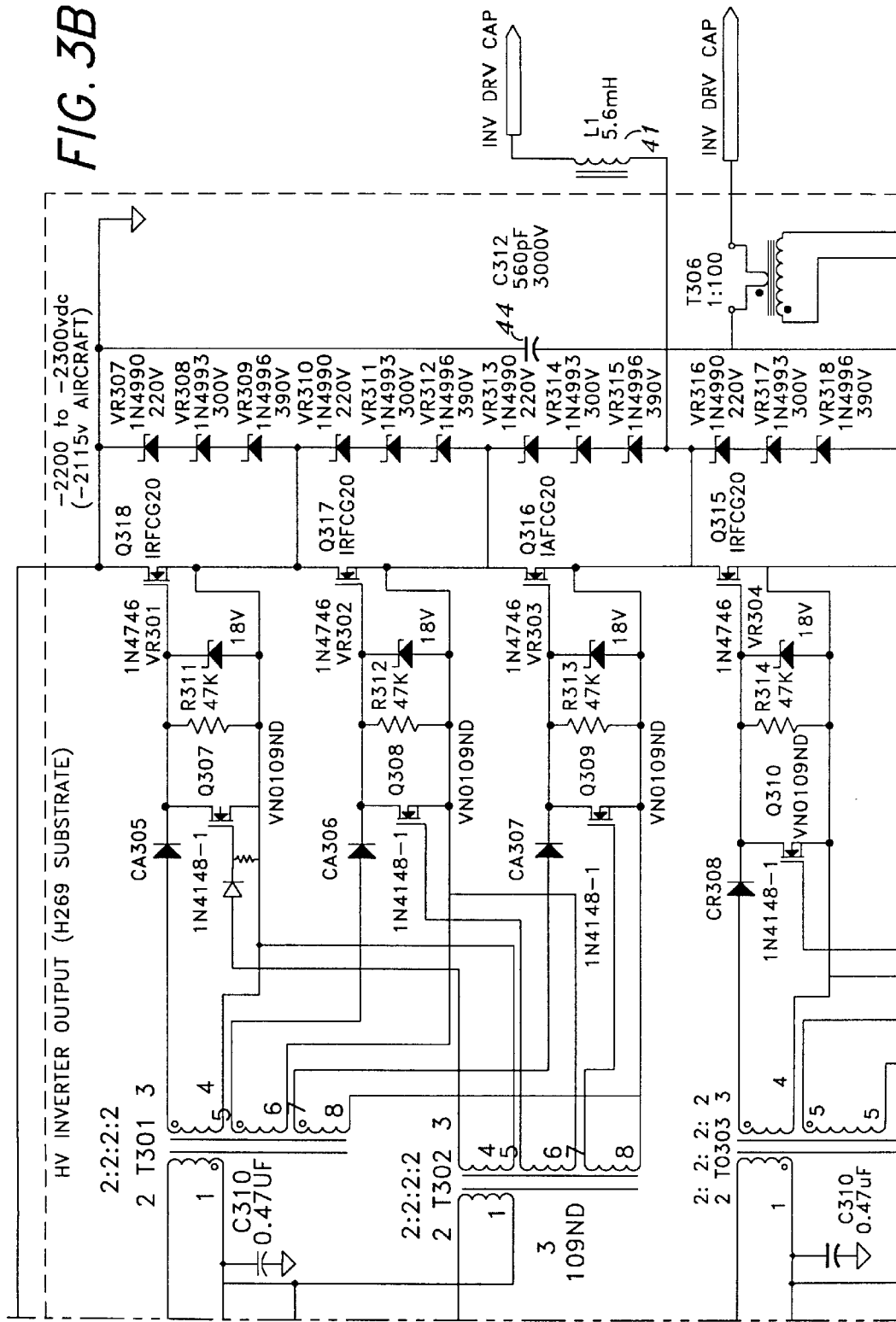
Figure 3C:
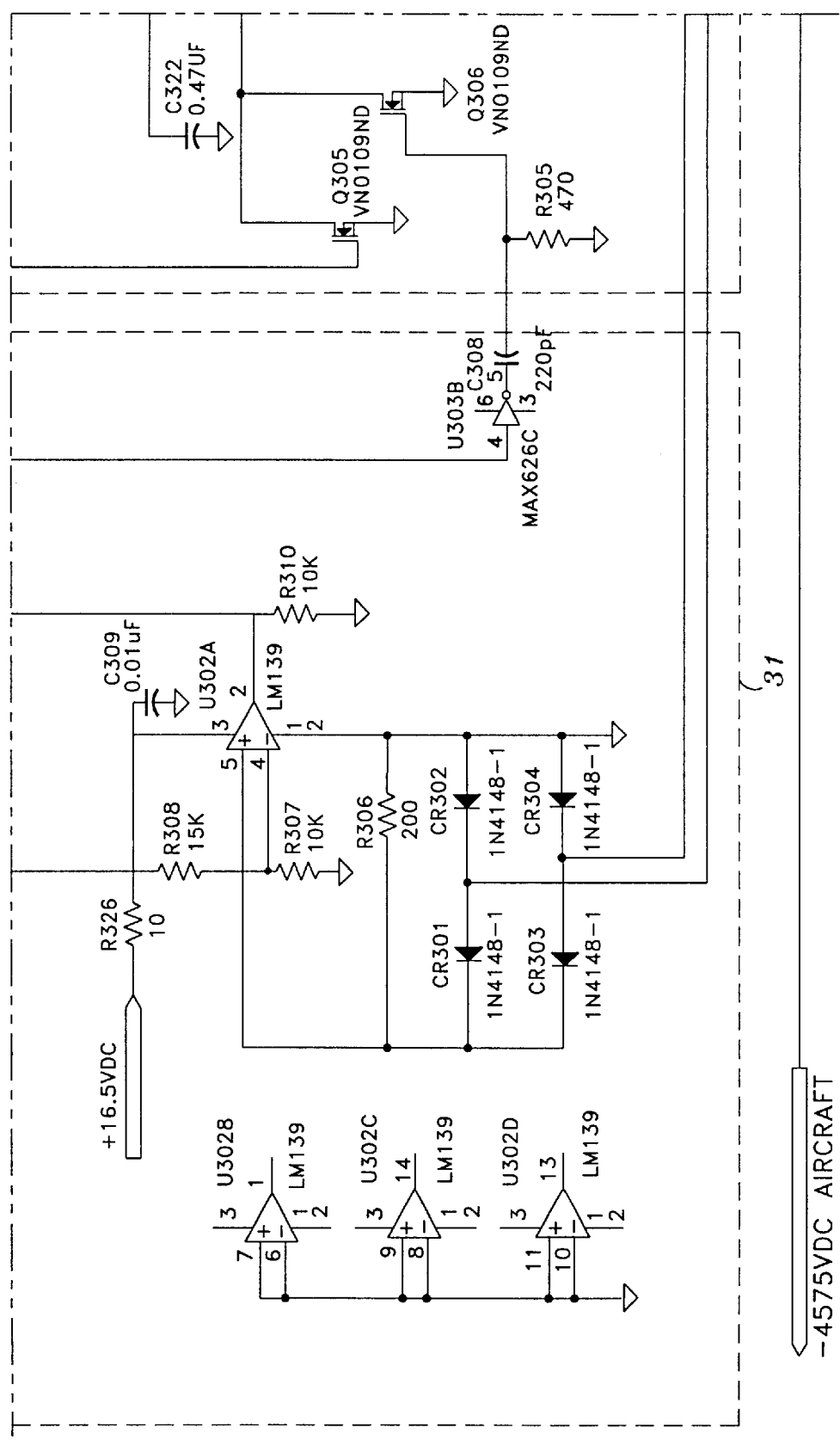
Figure 3D:
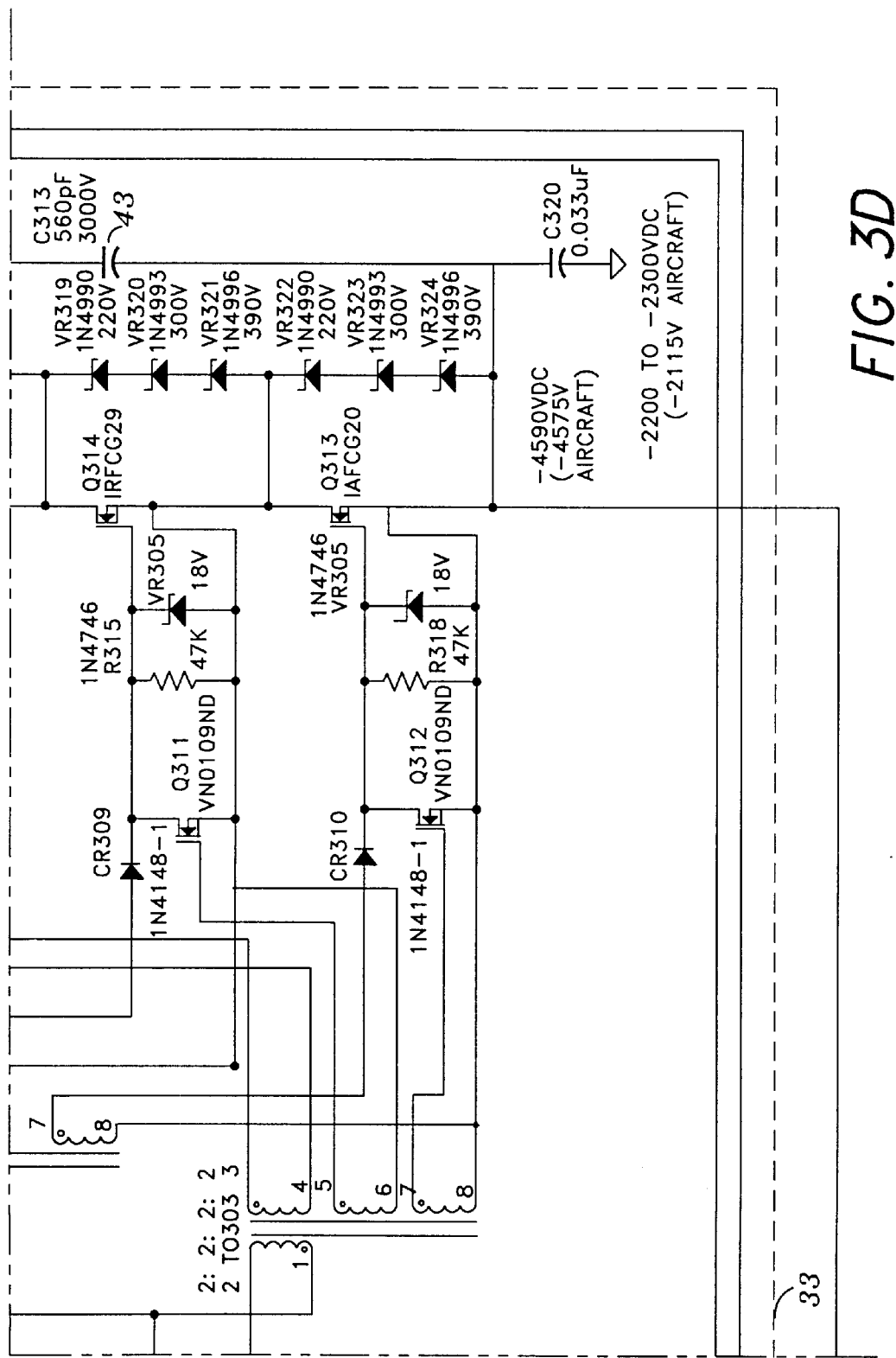
Figure 4:
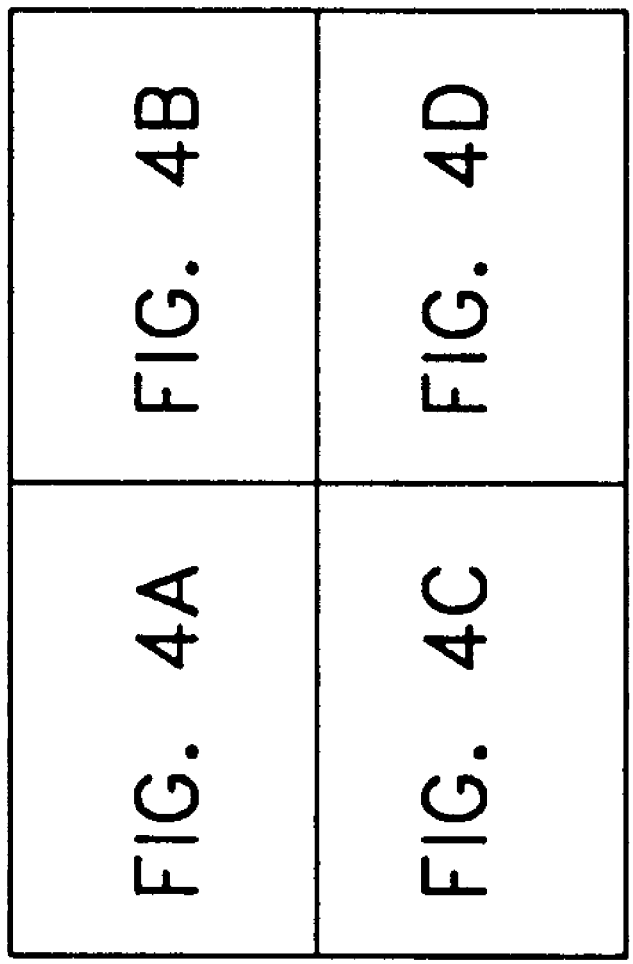
FIG. 4 is an electrical schematic diagram of a high voltage output and linear post regulator circuit, in accordance with the present invention.
Figure 4A:
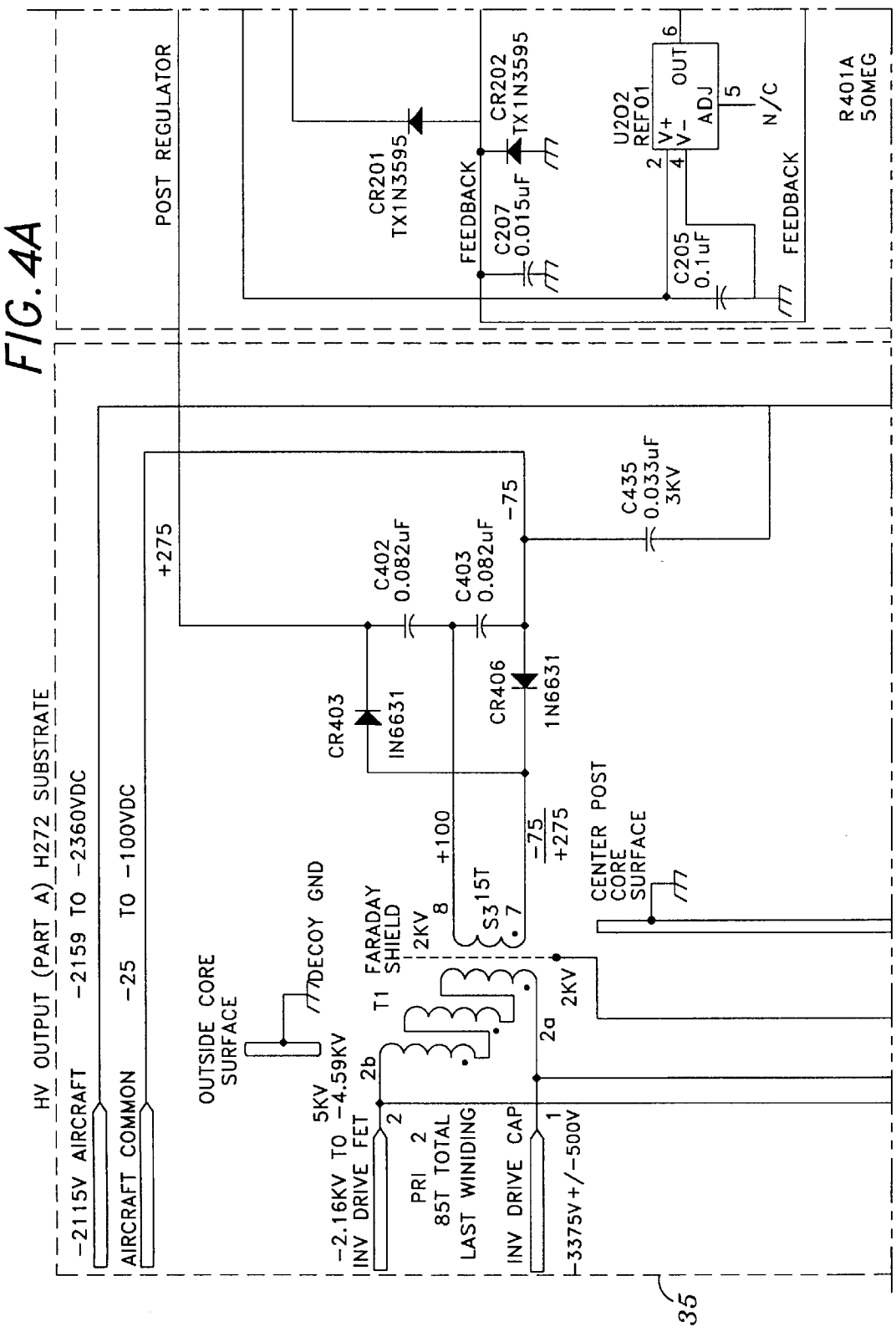
Figure 4C:
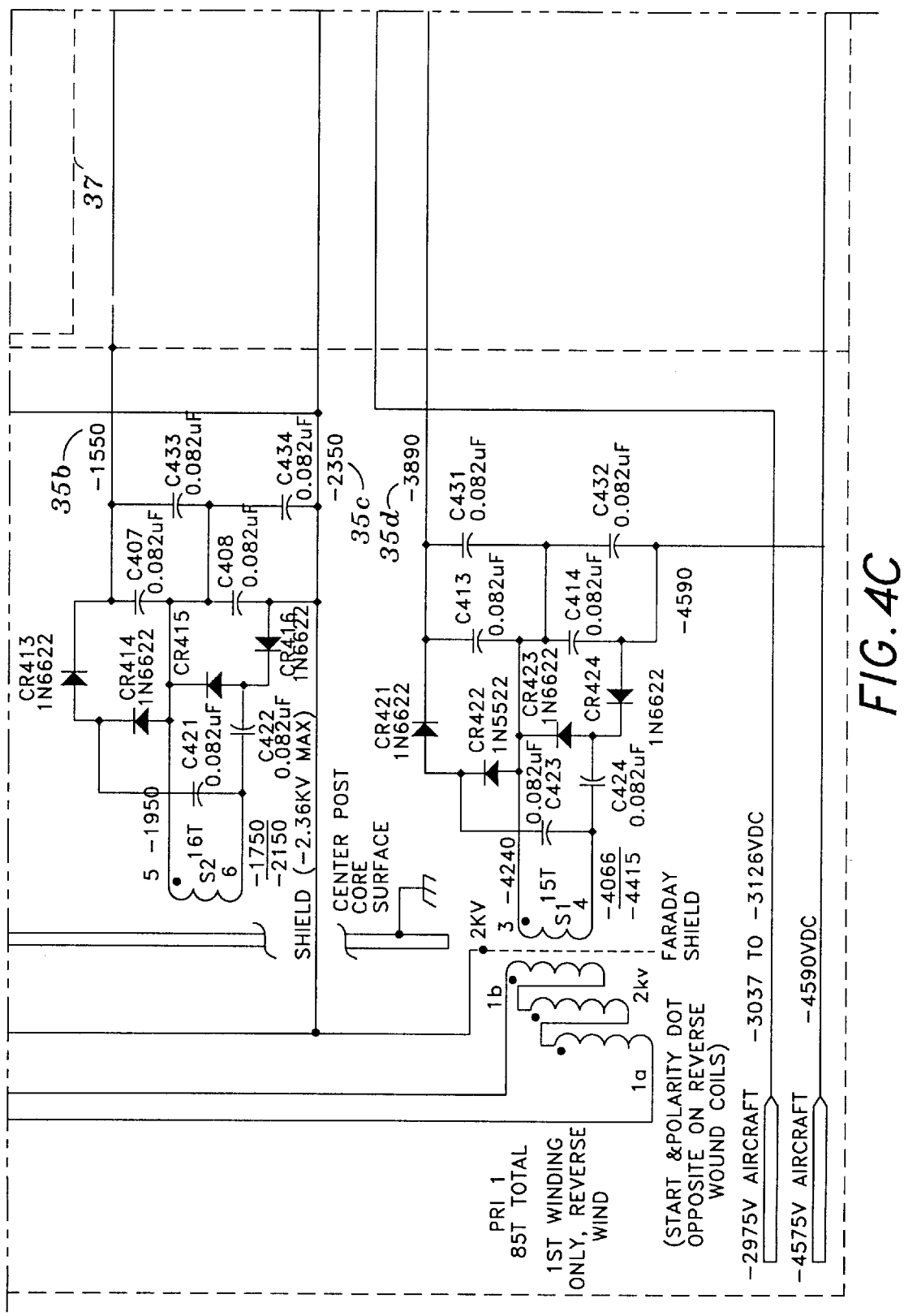
Figure 4D:
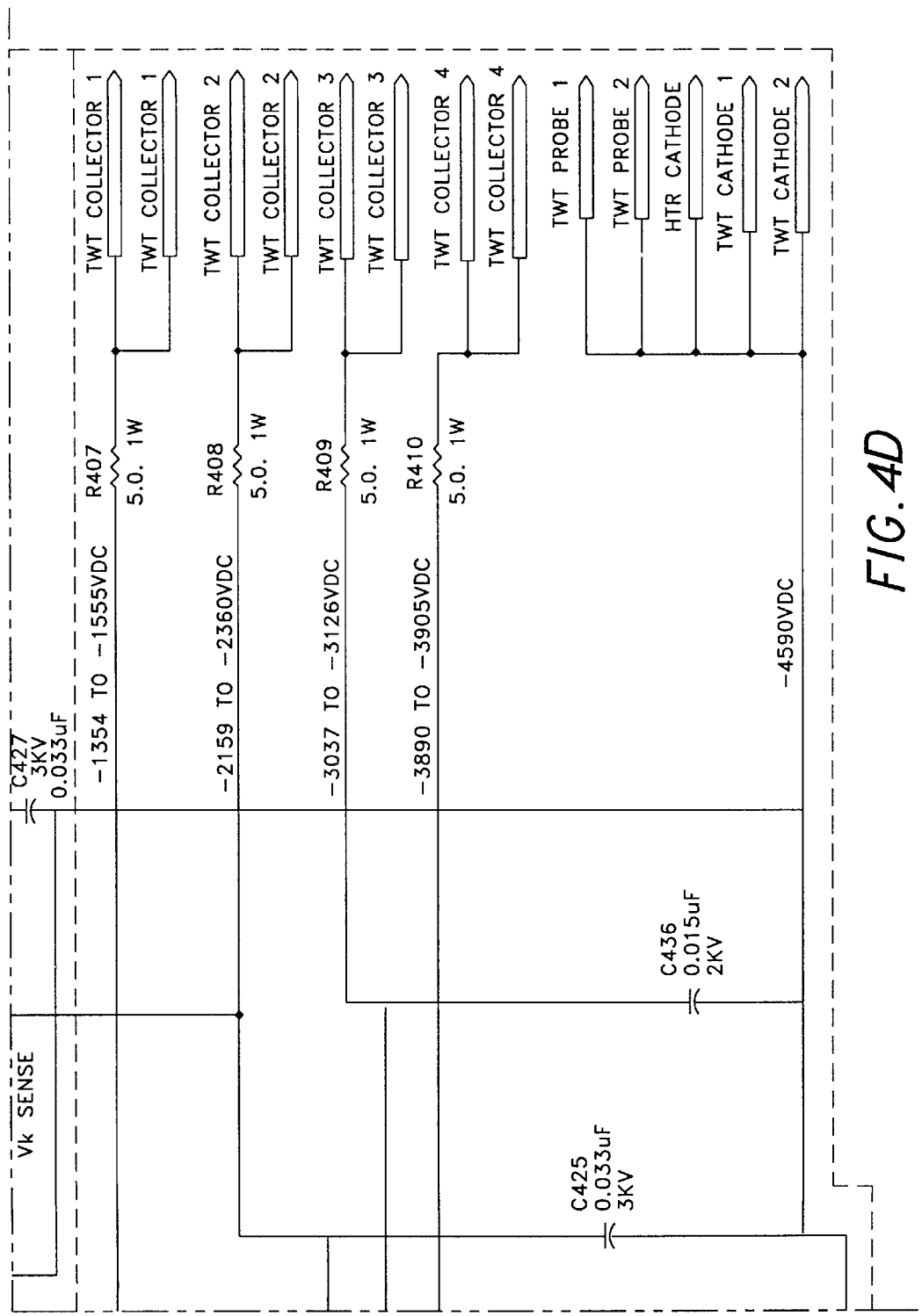

In the presently preferred topology, shown in greatest detail at FIGS. 3 and 4, a 150 kHz invertor provides the primary voltage for the step down transformer by chopping the high voltage input to the power converter. The TWT collector and helix voltages are then derived from the 1600V invertor driving a high voltage transformer. Secondary windings off this transformer are rectified, filtered, and stacked on collector 2 and common to make collector 1 and helix voltages, or from Vk to make collector 4 voltage, TWT heater and low voltage power are derived from the +350V input.

The undesirable effects of load and line variations, including +/−30% copper variations with temperature, was intentionally canceled with this frequency modulation technique. This technique replaces conventional pulse width modulation for primary voltage control, yielding a 10 percent increase in high voltage conversion efficiency, by maintaining full duty cycle operation of the PWM chip.

The switching frequency is automatically increased at the midband and high frequency RF load conditions and decreased for the low frequency RF loads to regulate voltages to safe and reasonable operating values. A frequency shift of approximately 9 percent from a nominal 150 kHz is all that is required to achieve this performance.

As an additional feature, accurate cathode regulation is accomplished with a linear helix post regulator, shown in greatest detail at FIG. 4. A post regulator control loop provides the required correction voltage to remove the cathode voltage droop with pulse loading. Variations in tow cable losses with temperature, input line or source voltage variations, and variations in helix current are removed with use of this control loop, thus maintaining accurate TWT cathode regulation.

The post regulator input voltage is highest with minimum processed power (high frequency end of band) due to collector 1 draw at its minimum value and collector 2 draw at maximum value. The tow cable drop is moderate at this condition and the secondary stack-up voltage is greatest with minimum collector 1 draw. At the opposite extreme, post regulator input voltage is smallest with maximum processed power (full RF drive, low frequency end of band) due primarily to collectors 1, 2, and helix all having near maximum current draw. Further, the post regulator input voltage is highest at the no RF drive condition due to minimum collector 1 and 2 draw producing a high secondary stack voltage.

Demonstrated power module conversion efficiency was determined to be greater than 88 percent with full RF load, and 87 percent with the no RF drive conditions. Computer models generated predicted the power and current distribution for three, four, five, or six wire decoy configurations. The models were proven to be accurate, since the predicted results correlated well to laboratory measurements.

Referring to FIGS. 3–5, a resonant half-bridge invertor is used to "chop" the high voltage input (1600V to 2400V), providing the input for the HV step-down transformer. A narrow pulse (tick)is used to turn the FETs "on" or "off" with the FET's gate to source capacitance used to store the charge and keep the FETs in this state between ticks. Dead time is intentionally incorporated between the two invertor half cycles to eliminate any undesirable cross conduction. In addition, two "off" ticks are used for each application of an "on" tick. At the end of each half cycle, the FETs which are "on", are turned "off" with a narrow pulse. Then after 400 nsec of dead time, they are again pulsed "off", simultaneously with the "on" pulse for the opposite FETs. The second "off" pulse keeps the intrinsic drain to gate capacitance from turning the FETs back on again during the invertor edges, thereby eliminating any undesirable commutation currents. Each half of the invertor uses two "off ticks" to turn the FETs "off". A UC1825 PWM is used for the oscillator and invertor control.

An external frequency modulation control loop is implemented to replace a pulse width modulation approach for collector and post regulator input voltage control in the final converter topology, yielding a 10 percent increase in high voltage conversion efficiency. This technique controls excessive post regulator input voltage by moving the switching frequency away from resonance to a point where the effective input voltage to the HV step-down transformer decreases. In contrast, operating at or near the series resonant frequency increases the effective input voltage to the transformer primary.

Figure 1:
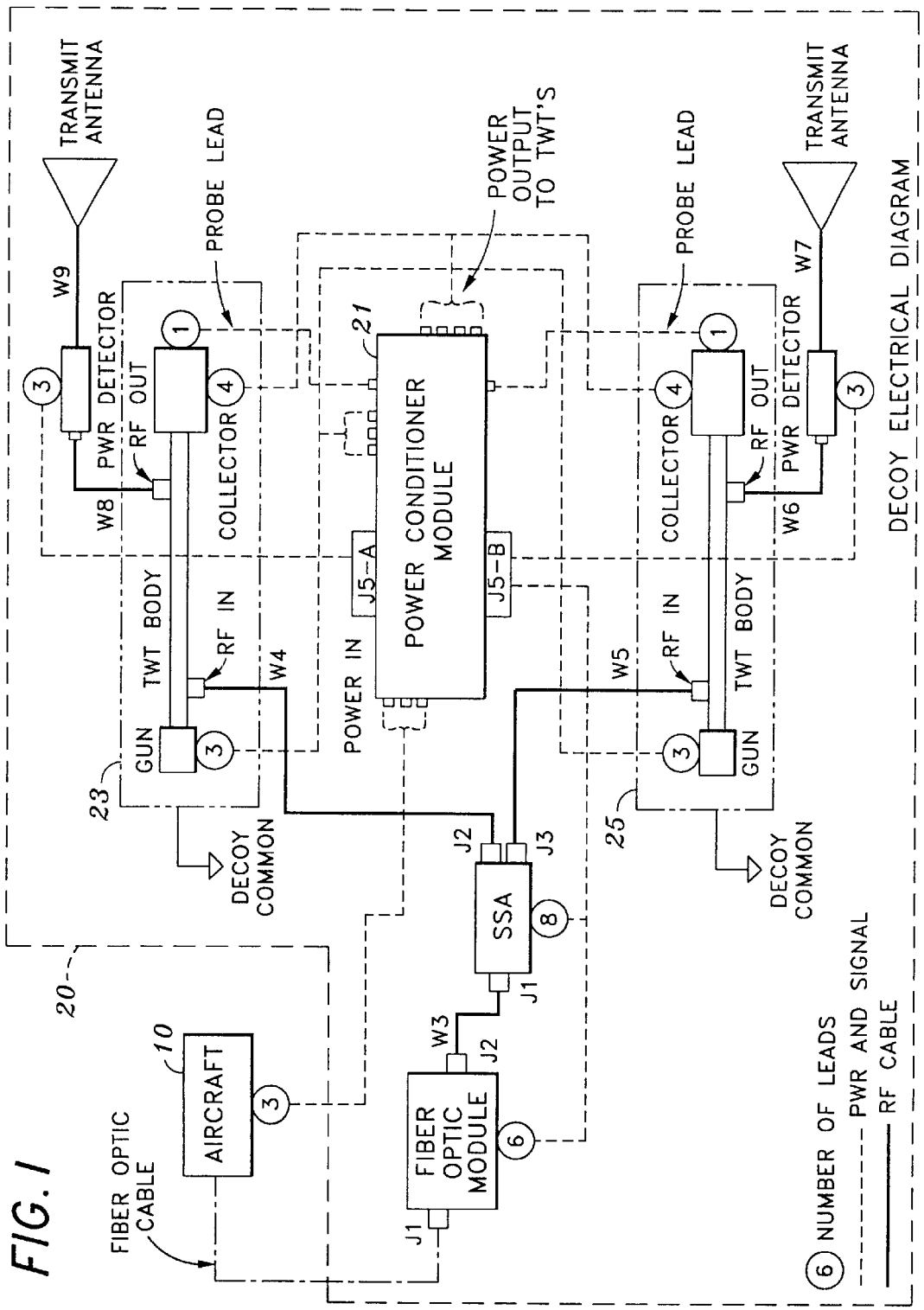
FIG. 1 is an electrical block diagram illustrating exemplary use of the present invention in conjunction with a pair of traveling wave tubes.

Referring to FIG. 1, an equipment electrical block diagram is provided which broadly illustrates use of the present invention in connection with an aircraft towed decoy application. As shown therein, the principal components of the system include the aircraft 10 and decoy 20. The decoy 20 principally includes power conditioner module 21 and traveling wave tubes 23, 25. As shown therein, power conditioner module 21 is provided directly from the aircraft 10, whereafter power signals are communicated to the TWTs 23, 25. Other control signals may be communicated from the aircraft, also through the tow cable, through the fiberoptic module and solid state amplifier, to the RF inputs to TWTs 23, 25. As explained in more detail below, the present application is directed to the construction and operation of the power conditioner module 21, as it regulates the power inputs to the TWT 23, 25.

Figure 2:
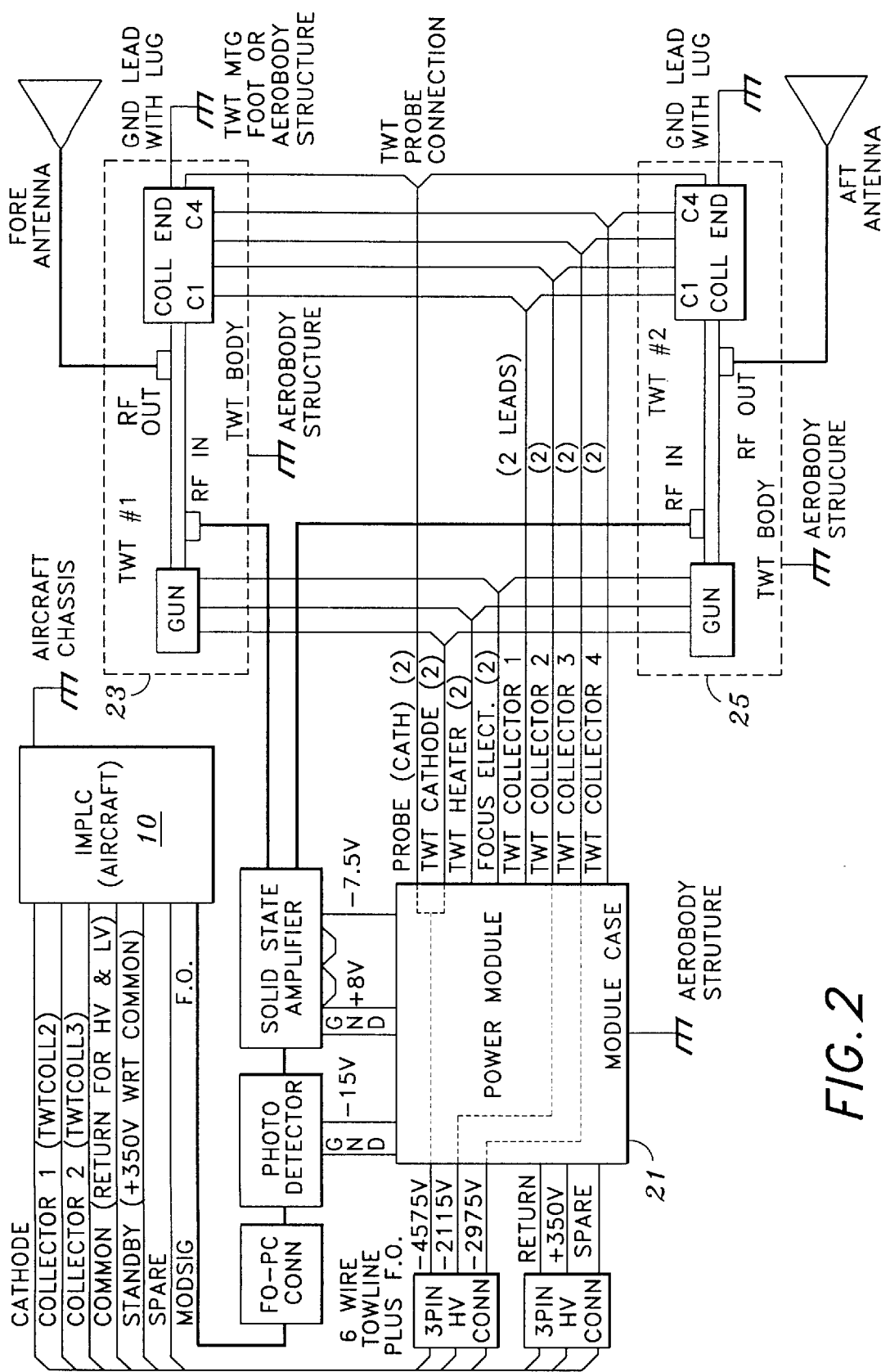
FIG. 2 is an electrical wiring diagram illustrating exemplary signal levels and wiring connections implementing a six wire version of the circuit illustrated in FIG. 1.

FIG. 2 illustrates in greater detail the signals into and out of the power conditioner module 21. As shown therein, power signals (light lines) and control signals (darker lines) are communicated from the aircraft 10. Control signals may be communicated through a fiberoptic format through FO-PC connector, photodetector, and solid state amplifier to the TWTs 23, 25. Power signals are communicated to the power conditioner module 21. Certain of the power input signals are directly communicated to TWTs 23, 25 at the collectors of the TWTs 23, 25. Other power signals are derived from the high voltage signals received from the aircraft, and then communicated to TWTs 23, 25. Principal aspects of the invention concern the function and construction of the power module to derive those additional power signals, and stabilize those signal levels in relation to variations in the high voltage signals received from the aircraft 10. As noted above, those variations may be responsive to a variety of environmental conditions, such as temperature, sensitivity variations in the tow cable, and other environmental factors. It is also noted herein, the other aspect of the invention concerns circuitry for stabilizing the cathode voltage level, to further mitigate variances in the operation of TWTs 23, 25.

FIGS. 3 and 4 provide greater detail of the operation of the power conditioner module 21. The circuitry shown in FIGS. 3 and 4 are encompassed within the power conditioner module 21, and principally include variable frequency invertor drive 31, high voltage invertor 33, high voltage output 35, and linear post regulator 37. Turning to FIG. 3, the variable frequency invertor drive 31 comprises a pulse width modulator 39, which may be implemented as a UC 1825. The PWM 39 operates to output a fixed pulse width, at full duty cycle pulse, at a nominal frequency of 87 kHz. The attending control circuitry operates to sense the collector 1 and collector 2 to voltage levels of the TWTs. Where the difference between collector 1 and collector 2 voltage levels exceed a preset level, i.e., 770 volts in the presently preferred embodiment, the PWM 39 is caused to shift the frequency of the signal communicated to the high voltage invertor 33.

The output of the high voltage invertor 33 is, in turn, passed through a series resonant circuit comprised of inductor 41 and capacitor 43. In the presently preferred embodiment, inductor 41 is implemented as a 5.6 mh inductor and capacitors C43, C44 are implemented as two 560 pF, 3,000V capacitors in parallel. The series resonant circuit functions to provide optimum voltage level output when the output of the high voltage invertor approximates the LC resonant frequency of the circuit, i.e., approximately 150 kHz. By maintaining the invertor output at a frequency level slightly displaced from the resonant frequency, the output voltage level may be regulated by slight changes in the output frequency, i.e., by regulating the operation of PWM 39. As such, the present invention takes advantage of the bell shaped characteristics of a series resonant circuit, modifying the output frequency as a means to regulate output voltage levels. This provides a simple and reliable method of regulating output voltage without the need for varying pulse widths, which requires the inclusion of compatible circuitry to accommodate such pulse width variations. Varying pulse width, especially narrow pulse width, tends to turn the FETs back on due to leakage inductance ringing, requiring implementation of more complicated gate drive circuitry.

FIG. 4 illustrates high voltage output circuit 35 and linear pulse regulator circuit 37. The high voltage output circuit functions to receive the output from the high voltage invertor 33. The voltage is communicated through step down transformer 45 to derive outputs on lines 35a, 35b, 35c, and 35d. The signal on line 35a is communicated to the linear regulator circuit 37, described in more detail below. The signal on line 35b is output to the TWT collector 1. The signal on line 37c is communicated directly to collector 2. The signal on line 35d is communicated to TWT collector 4. As noted above in connection with FIG. 3, the circuit communicates voltage levels at collectors 1 and 2 to the variable frequency invertor drive circuit 31, to thereby regulate the operation of PWM 39.

Linear post regulator circuit 37 functions to sense voltage levels at the TWT cathode, and to regulate those levels by maintaining the cathode voltage at the desired level. As a result, instability due to cathode variances are mitigated.

Figure 5A:
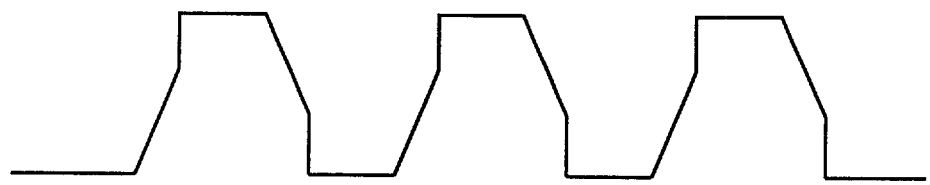
FIG. 5 is a series of timing diagrams illustrating electrical signals within the circuits illustrated at FIGS. 3 and 4.
Figure 5B:
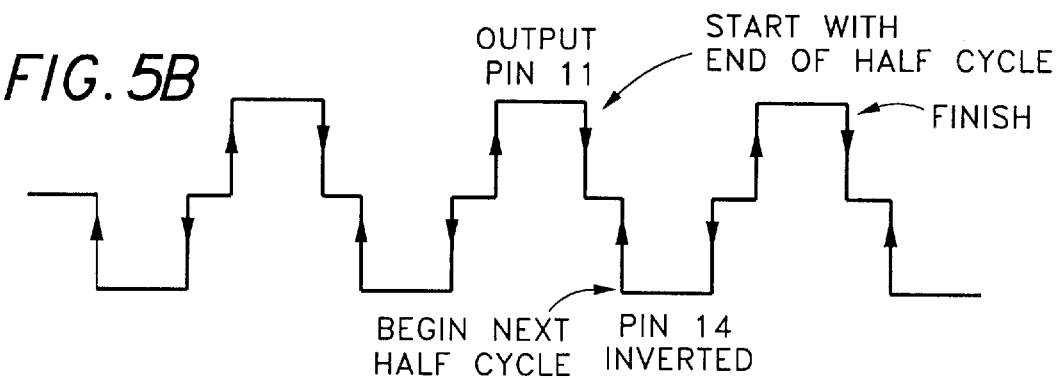
Figure 5C:
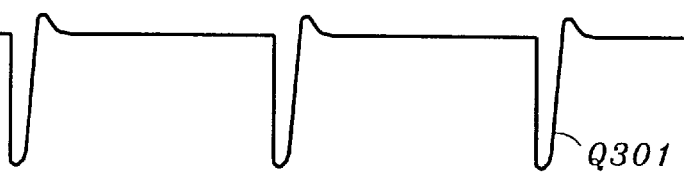
Figure 5D:
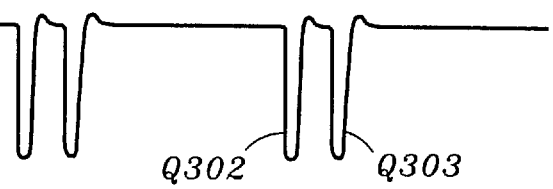
Figure 5E:
Figure 5F:
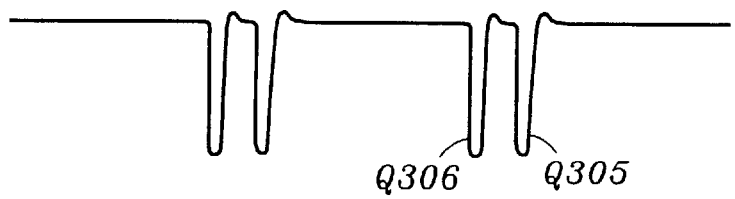

FIGS. 5a–5f illustrate electrical signal levels at various points within the circuit set forth in FIGS. 3 and 4. FIG. 5a approximates the output of the high voltage invertor 33. FIG. 5b illustrates the signal levels measured between pins 11 and 14 of the PWM 39. FIGS. 5c–5f illustrates signal levels representative of the on and off transitions of transistors Q301–306 of the high voltage invertor 33.

Figure 6:
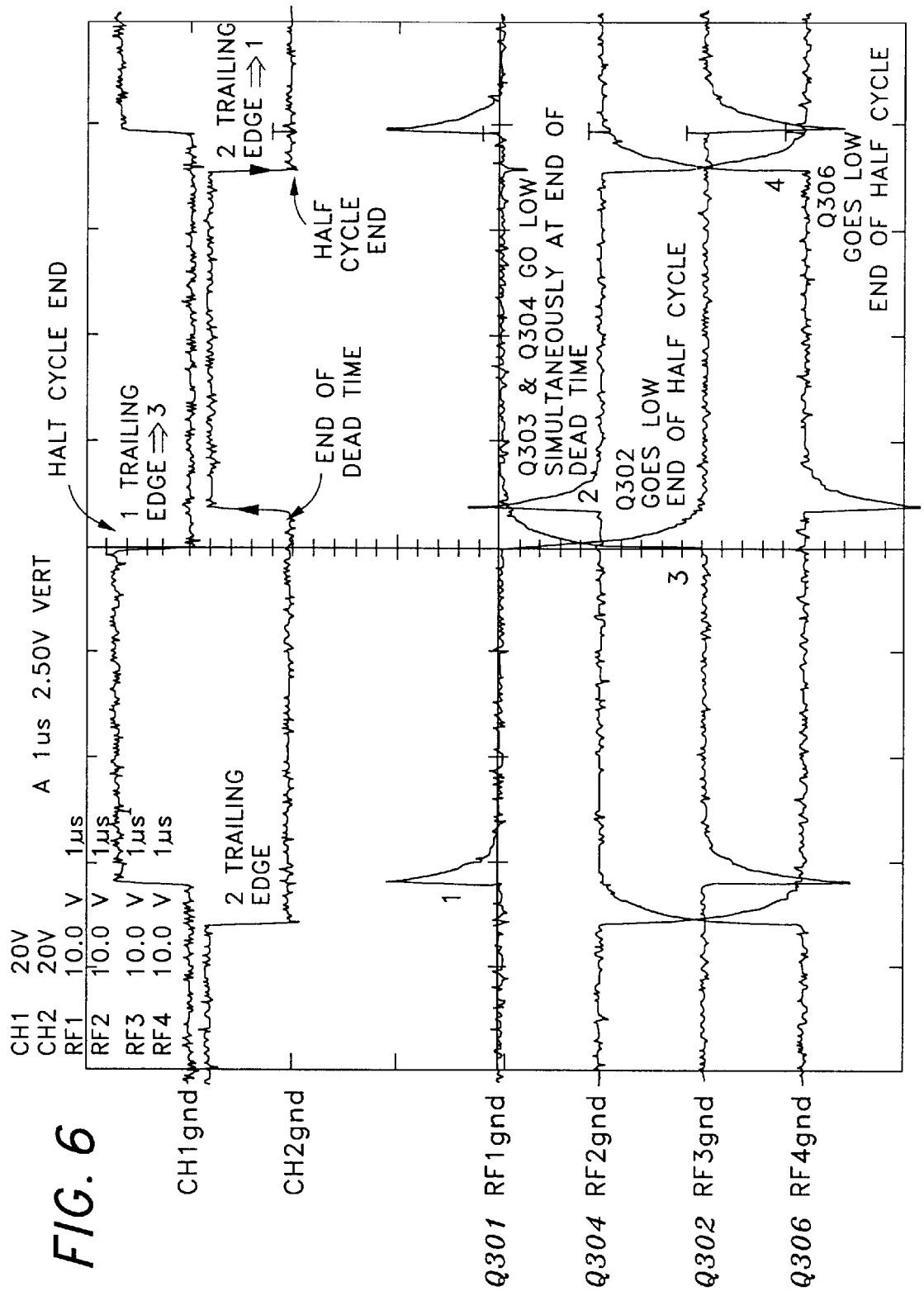
FIG. 6 is a series of electrical signals measured at points within the circuits shown at FIGS. 3 and 4.

FIG. 6 illustrates measured voltage conditions within the high voltage invertor 33. As shown therein, the measured voltage conditions generally conform to the anticipated waveforms set forth in FIG. 5.

Figure 7:
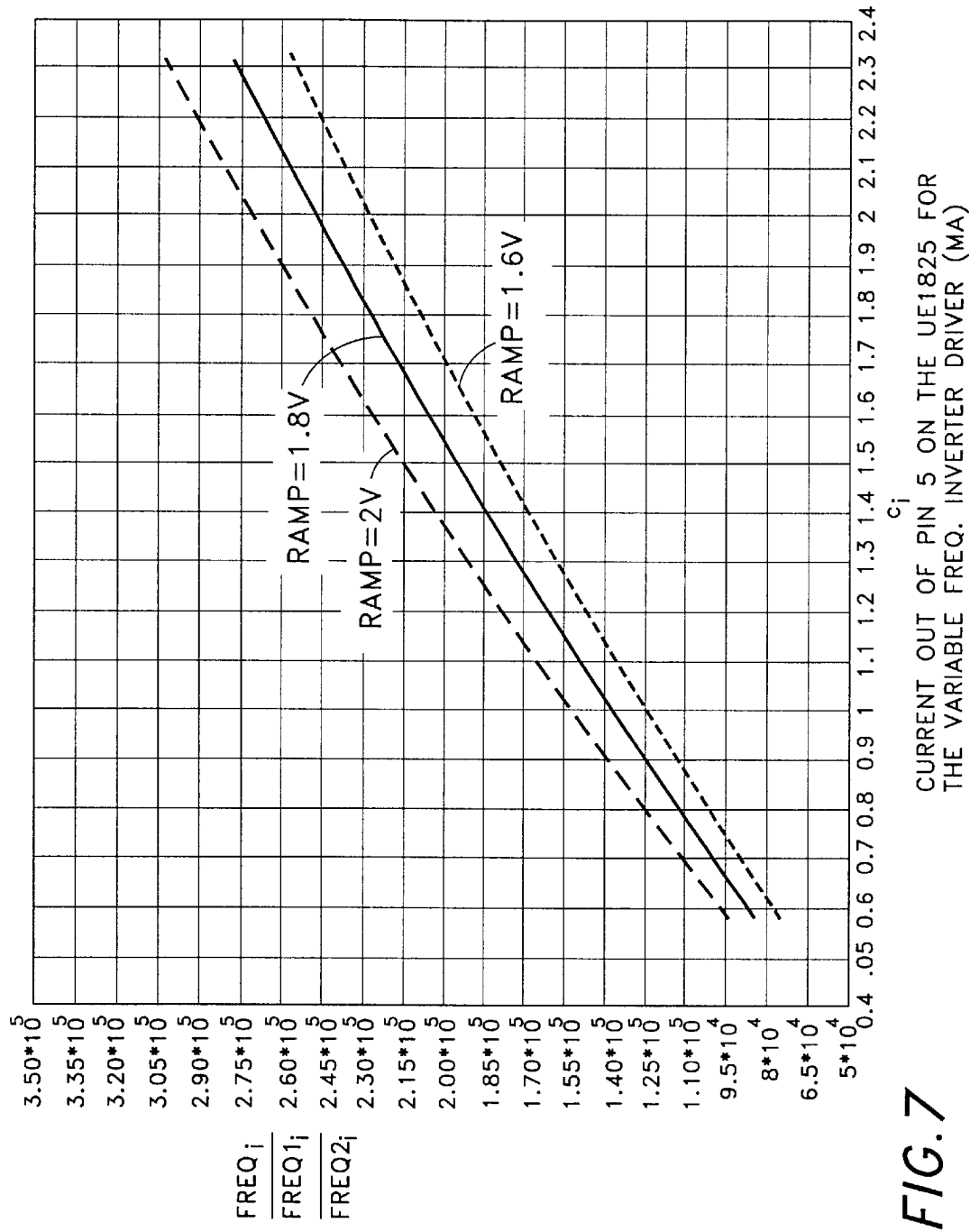
FIG. 7 is a chart illustrating the frequency response of the variable frequency invertor drive, shown at FIGS. 3 and 4.

FIG. 7 illustrates the output frequency response of the high voltage invertor 33, in response to input current change at pin 5 to PWM 39. As noted in FIG. 7, an increase in the differential voltage between collectors 1 and 2 causes an increase in current out of pin 5 to the PWM 39, which in turn causes an increase in the operating frequency of the high voltage invertor 33 depending upon the current sink at pin 5, the operating frequency of the high voltage invertor 33 will vary along corresponding curves ranging between approximately 75,000 Hz to approximately 300,000 Hz.

Figure 8:
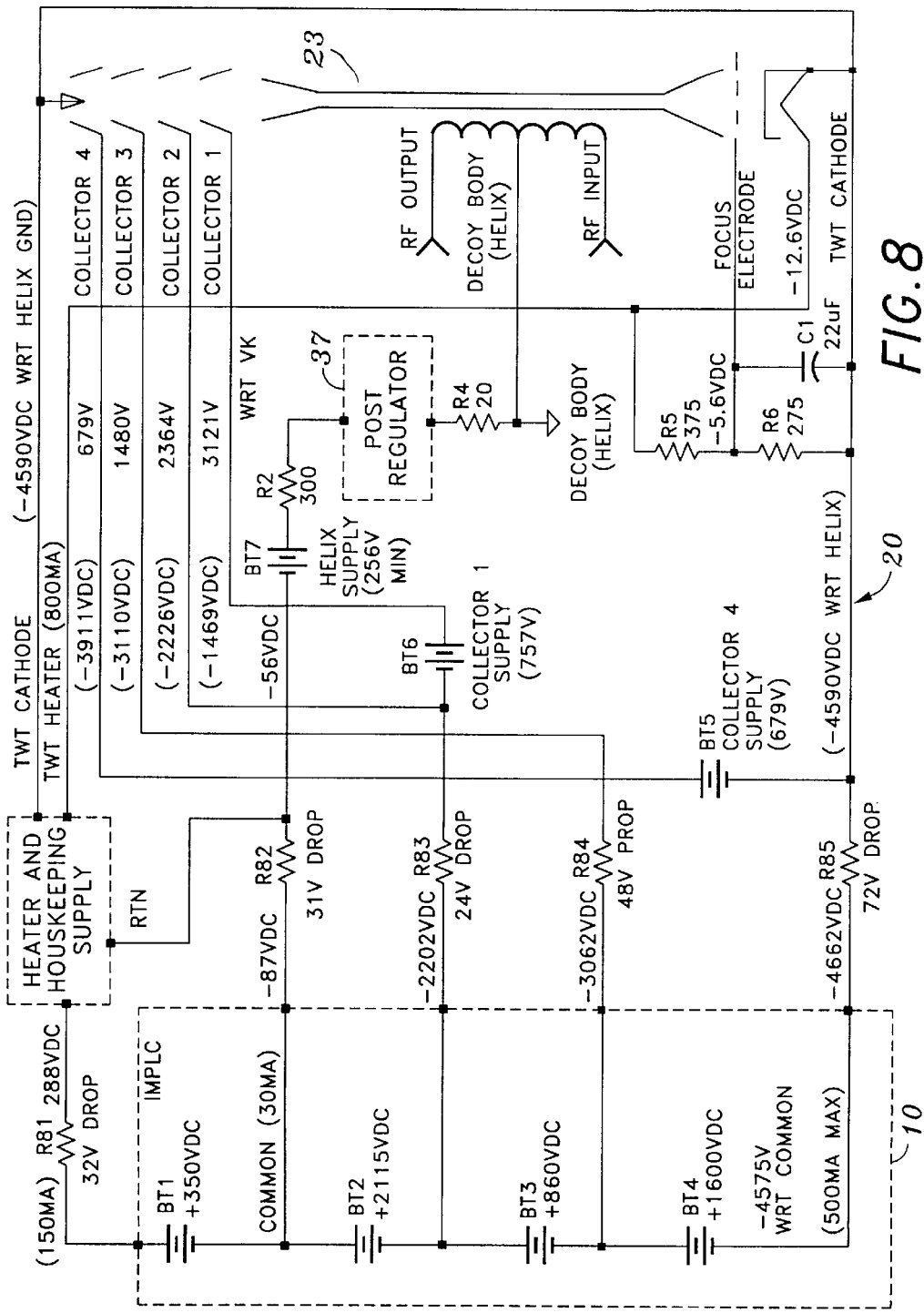
FIG. 8 is a simplified circuit diagram illustrating use of the invention in connection with a five wire tow cable.
Figure 9:
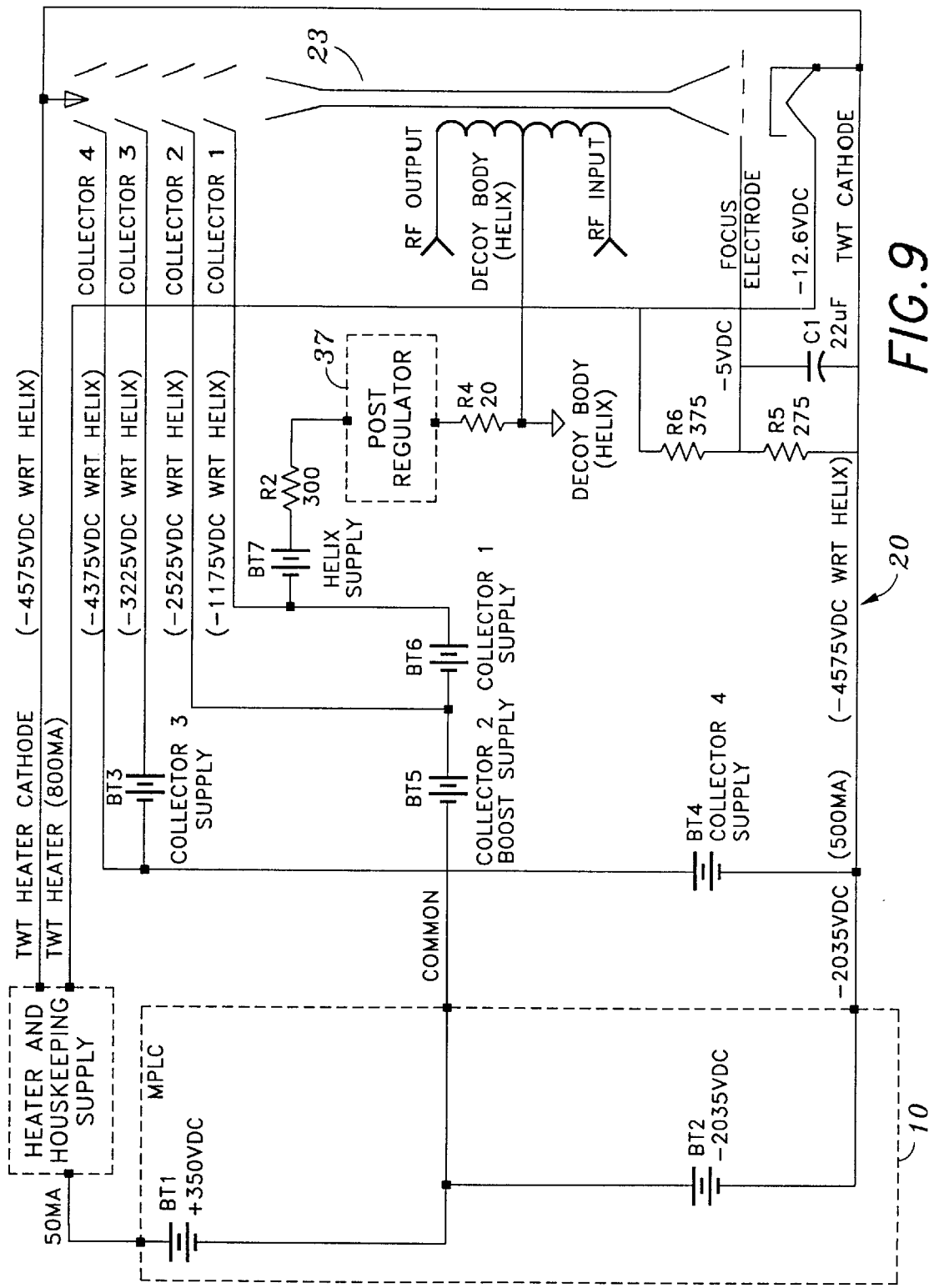
FIG. 9 is a simplified circuit diagram illustrating use of the invention in connection with a three wire tow cable.
Figure 10:
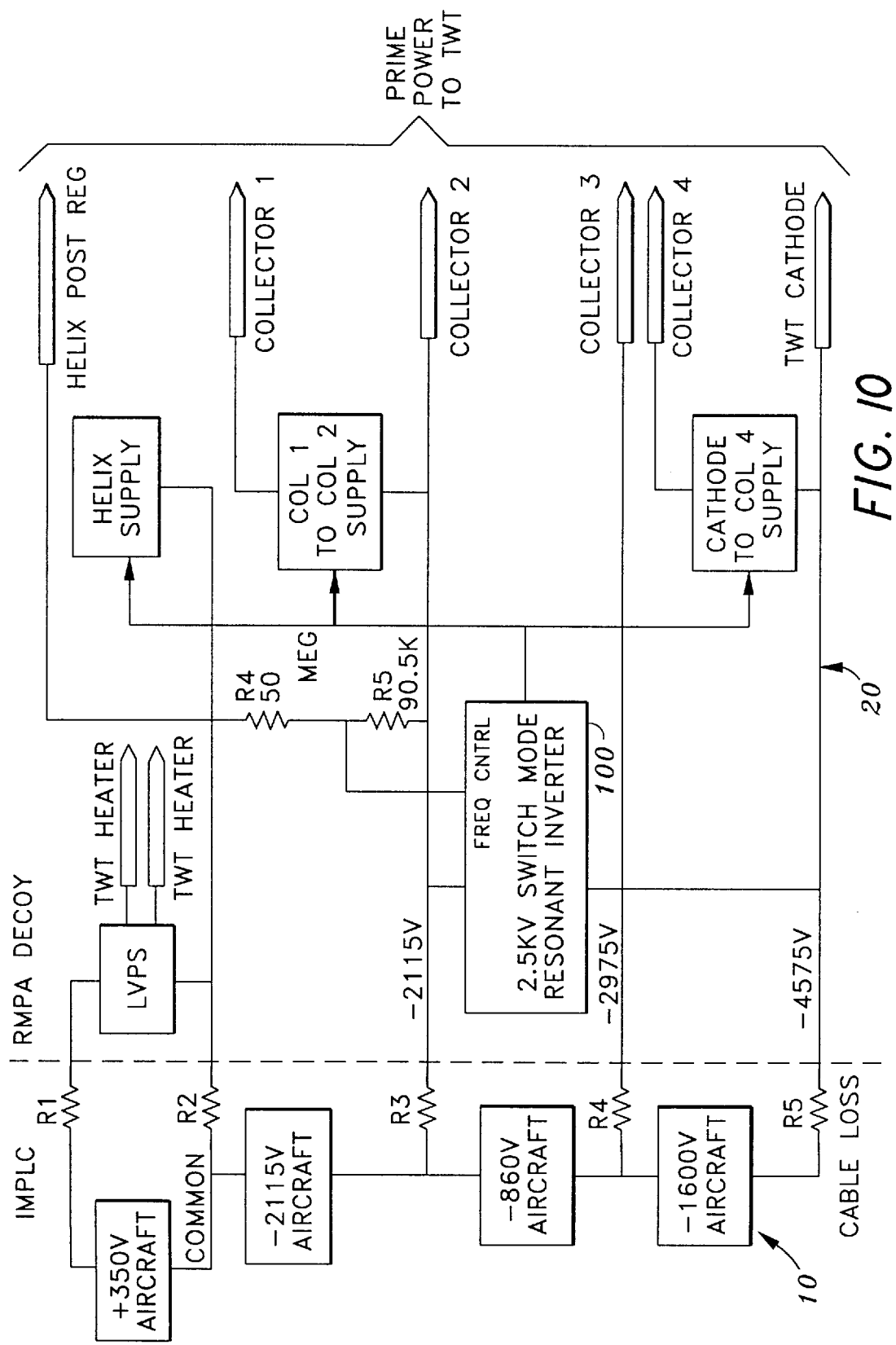
FIG. 10 is an another simplified circuit diagram illustrating use of the present invention in conjunction with inputs to a traveling wave tube.

FIGS. 8, 9, and 10 illustrate simplified block diagrams of the invention, as implemented in different configurations. FIG. 8 illustrates a configuration wherein the aircraft 10 is configured to output a five wire tow cable to the decoy 20. Voltage levels from the aircraft 10 are reduced by voltage drops, represented by resistors R81–85. The voltages derived in accordance with the invention are represented as collector 1 supply BT6, collector 4 supply BT5, and helix supply BT7. The signal levels of collector 1, 4 and helix supplies are varied in accordance with frequency modulation techniques described above. The post regulator 37 facilitates regulation of the TWT cathode, as described above.

FIG. 9 illustrates a similar configuration, implemented in connection with an aircraft having a three wire tow cable, as opposed to the five wire tow cable represented by the circuit of FIG. 8. Again, the derived power supplies are represented by collector 1 supply BT6 and collector 2 boost supply BT5, collector 3 supply BT3, and collector 4 supply BT4. Again post regulator 37 operates to regulate TWT cathode.

FIG. 10 provides an alternate electrical block diagram illustrating the interface between aircraft 10 and the decoy 20. The implementation is a five wire implementation, with cable voltage losses represented as resistors R1–5. The functions of the variable frequency invertor drive 31, resonant invertor 33, high voltage output 35 and post regulator circuit 37 are collectively represented by switch mode resonant invertor 100.

Figure 11:
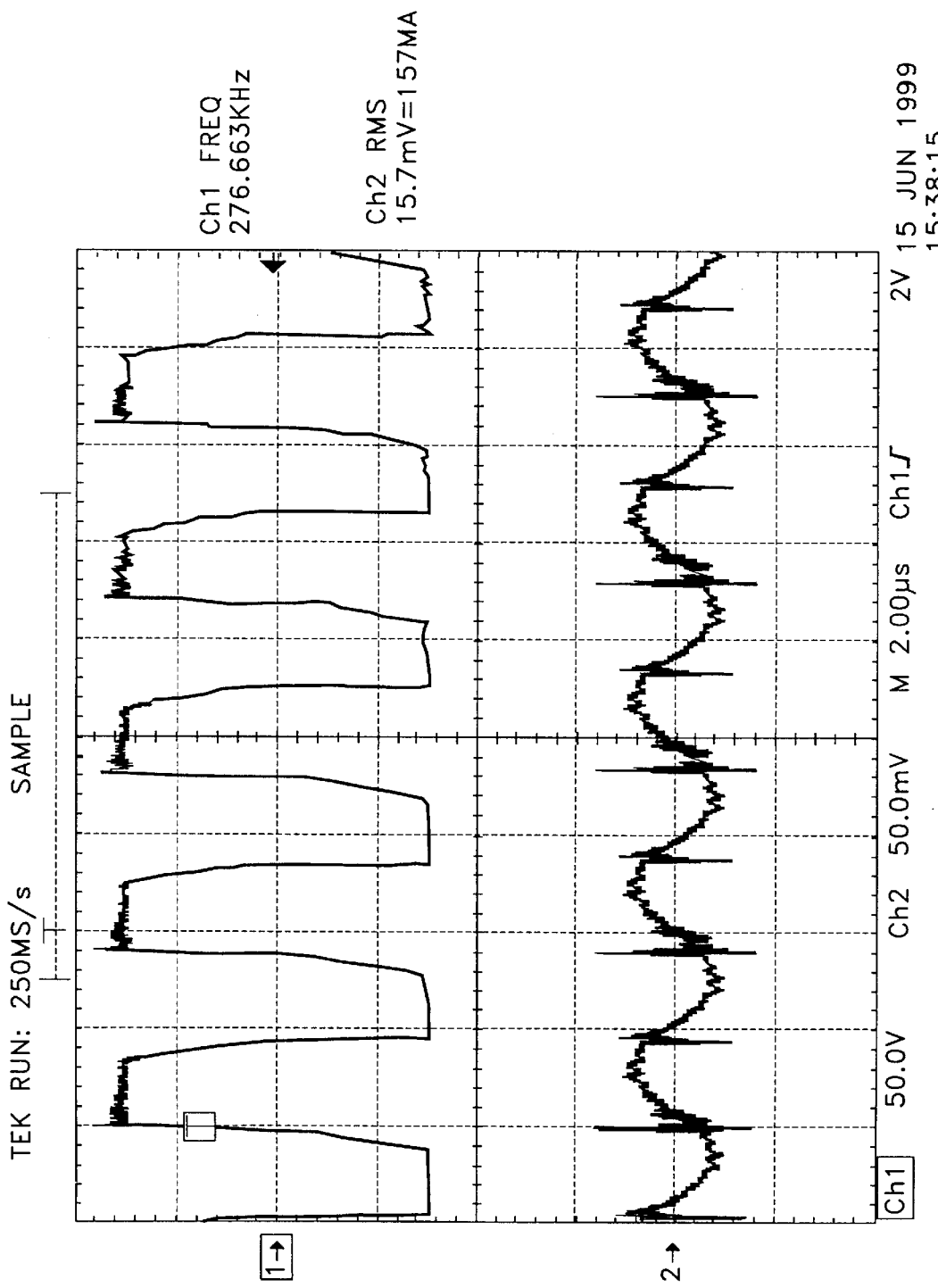
FIG. 11 is an electrical signal diagram illustrating a portion of the variable frequency invertor drive response to a 1500 volt input signal.
Figure 12:
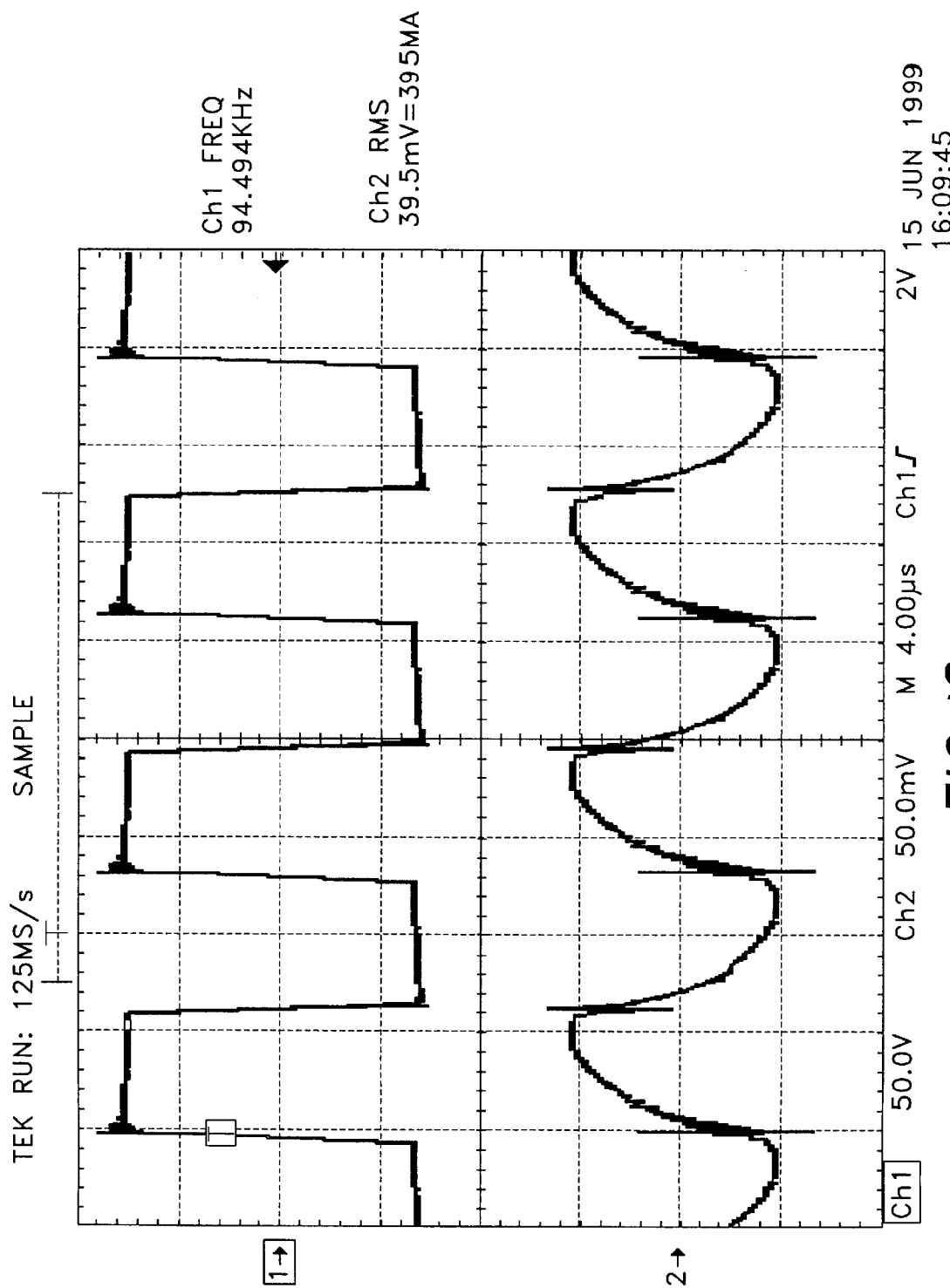
FIG. 12 is an electrical signal diagram illustrating a portion of the variable frequency invertor drive response to a 1443 volt input signal.

FIG. 11 and 12 illustrate the measured invertor output conditions for different levels of input voltages. As shown at FIG. 12, invertor output substantially approximates a square wave wherein transistor switching losses are minimized, as can be seen by a comparison with the measured signals illustrated at FIG. 11. With higher load level, as represented in FIG. 12, energy stored in the resonant reactor, due to the higher levels of current, provides nearly a complete voltage slew, removing the burden from the transistor switch for best efficiency. In contrast, lighter loads for the invertor, as represented in FIG. 11, result in less efficiency and higher losses in the FETs as the FET provides the voltage transition.

As indicated above, the above description represents implementation of one embodiment of the invention, in connection with the particular application. However, as recognized by one of ordinary skill, the invention can be implemented in various embodiments, as may be most appropriate for a particular application. Accordingly, the above description is not intended to be limiting in relation to the broader aspects of the invention, as set forth in the foregoing claims.

What is claimed is:

1. A power conditioner for powering microwave power amplifiers comprising:
   a) an input port for receiving at least one unstable high voltage DC input;
   b) a variable frequency invertor drive unit in electrical communication with the input port, said drive comprising a fixed pulse width modulator to generate a high voltage square-wave output frequency signal, and a frequency modulation circuit operative to frequency regulate said square-wave output signal in response to a received difference signal; and
   c) a series resonant circuit having a resonant frequency and in electrical communication with the invertor drive unit to receive said square-wave output frequency signal, said resonant circuit operative to compare the frequency of said square-wave output signal with said resonant frequency and to therefrom generate said difference signal communicated to said frequency modulation circuit wherein the resulting frequency regulated square-wave output signal is maintained within a predetermined offset frequency range above said resonant frequency.

2. The power conditioner as recited in claim 1 wherein the received high voltage DC input is between 1600V to 2400V.

3. The power conditioner as recited in claim 1 wherein the invertor comprises a plurality of field effect transistors (FETs) disposed in series connection, the FETs being arranged in a half-bridge configuration and operable to chop the high voltage DC input in response to operation of the frequency modulation control circuit.

4. The power conditioner as recited in claim 1 wherein the frequency modulation control circuit is operative to generate FET on/FET off signals to regulate the operation of the FETs.

5. The power conditioner as recited in claim 4 wherein the frequency modulation control circuit is operative to generate two FET off signals during each half cycle of FET operation.

6. The power conditioner as recited in claim 5 wherein a first FET off signal is generated at the end of each half cycle, and a second FET off signal is generated less than one quarter FET cycle thereafter.

7. The power conditioner as recited in claim 6 wherein the second FET off signal is generated approximately 400 nsec after the first FET off signal.

8. The power conditioner as recited in claim 7 wherein the second FET off signal is operative to prevent FET drain to gain capacitance from turning the FET back on during the invertor edges.

9. The power conditioner as recited in claim 8 wherein the second FET off signal is operative to eliminate undesirable commutation currents.

10. The power conditioner as recited in claim 1 wherein the frequency modulation control circuit operates at a normal frequency of 150 kHz.

11. The power conditioner as recited in claim 10 wherein the frequency modulation control circuit is operative to modulate chop frequencies between 100 kHz and 300 kHz.

12. The power conditioner as recited in claim 1 further comprising a post regulator circuit, connected to the invertor output to enhance stability of the invertor output in response to variations in input signal and variations in load conditions.

13. The power conditioner as recited in claim 12 wherein the power amplifier includes a cathode in electrical communication with the post regulator circuit.

14. A method of selectively regulating a high voltage DC supply of a high voltage microwave amplifier disposed within a tethered aircraft decoy, the method comprising:
   a) receiving a plurality of unstable high voltage signals;
   b) combining the received high voltage signals to generate a derived high voltage DC signal;
   c) communicating the derived high voltage signal to a series resonant regulation circuit;
   d) comparing the frequency of said high voltage signal with a predetermined resonant frequency of said resonant regulation circuit; and
   e) varying the operating frequency of a fixed pulse width modulator used to generate the derived high voltage signal, the frequency variation being effective to translate the derived voltage signal in relation to the resonant frequency of the series resonant circuit, wherein the varied voltage level of the derived high voltage signal output is maintained within an offset predetermined frequency range above said resonant frequency.

15. The method as recited in claim 1 wherein the received high voltage signals are communicated via an extended length tow cable, and wherein the tow cable resistance is variable by +/−30 percent.

* * * * *